United States Patent
Ohtsubo et al.

(10) Patent No.: US 8,094,995 B2
(45) Date of Patent: Jan. 10, 2012

(54) PLURAL DRIVE DEVICE DELAY COUNTERMEASURE AND RECORDING/REPRODUCTION DEVICE PERFORMING POWER SAVING CONTROL

(75) Inventors: Shohji Ohtsubo, Osaka (JP); Junichiro Soeda, Nara (JP)

(73) Assignee: Panasonic Corporation, Osaka (JP)

( * ) Notice: Subject to any disclaimer, the term of this patent is extended or adjusted under 35 U.S.C. 154(b) by 642 days.

(21) Appl. No.: 12/304,001

(22) PCT Filed: Jul. 30, 2007

(86) PCT No.: PCT/JP2007/064846
§ 371 (c)(1),
(2), (4) Date: Dec. 9, 2008

(87) PCT Pub. No.: WO2008/018307
PCT Pub. Date: Feb. 14, 2008

(65) Prior Publication Data
US 2010/0272416 A1  Oct. 28, 2010

(30) Foreign Application Priority Data
Aug. 11, 2006 (JP) ................................ 2006-219980

(51) Int. Cl.
*H04N 5/89* (2006.01)
*H04N 5/84* (2006.01)
(52) U.S. Cl. ....................................... 386/326; 386/332
(58) Field of Classification Search .................. 386/326, 386/332–336
See application file for complete search history.

(56) References Cited

U.S. PATENT DOCUMENTS

| | | | |
|---|---|---|---|
| 5,726,956 A | 3/1998 | Kanno | |
| 6,822,764 B1* | 11/2004 | Okabe et al. | ................... 358/442 |
| 7,072,576 B2 | 7/2006 | Tanaka | |
| 2002/0034379 A1 | 3/2002 | Tanaka | |
| 2002/0135823 A1* | 9/2002 | Okamura | ....................... 358/505 |
| 2005/0210519 A1 | 9/2005 | Ito | |
| 2005/0229222 A1* | 10/2005 | Relan et al. | ................... 725/100 |

(Continued)

FOREIGN PATENT DOCUMENTS
EP   1 178 390   2/2002
(Continued)

OTHER PUBLICATIONS
Supplementary European Search Report issued Oct. 29, 2009 in EP 07 79 1540.

(Continued)

*Primary Examiner* — Thai Tran
*Assistant Examiner* — Nigar Chowdhury
(74) *Attorney, Agent, or Firm* — Wenderoth, Lind & Ponack, L.L.P.

(57) ABSTRACT

The present invention is equipped with a plurality of low-cost middle-capacity hard disks that are combined together to realize a large capacity at the same level as a large-capacity hard disk, and performs power-saving management to minimize the power consumption by the hard disks. At the same time, the present invention eliminates delays for accessing the separate hard disks. For this purpose, the present invention puts any of a plurality of drive devices other than a current access-target drive into a power-saving state, and puts the next access-target drive into a stand-by state from the power-saving state during the access to the current access-target drive, by calculating a remaining time until completion of the access to the current access-target drive.

10 Claims, 12 Drawing Sheets

U.S. PATENT DOCUMENTS

2007/0073956 A1 * 3/2007 Goma et al. .................. 710/310

FOREIGN PATENT DOCUMENTS

| JP | 1-119956 | 5/1989 |
|---|---|---|
| JP | 6-338123 | 12/1994 |
| JP | 8-315495 | 11/1996 |
| JP | 11-306190 | 11/1999 |
| JP | 2002-163076 | 6/2002 |
| JP | 2005-302276 | 10/2005 |

OTHER PUBLICATIONS

International Search Report issued Oct. 24, 2007 in the International (PCT) Application of which the present application is the U.S. National Stage.

* cited by examiner

FIG. 2

VIDEO/AUDIO DATA INFORMATION

| VIDEO/AUDIO DATA ID | DATA(2) |
|---|---|
| TOTAL SIZE | 4GB |
| BIT RATE | 5Mbps |
| PLAYBACK DIRECTION | FORWARD DIRECTION |
| PLAYBACK SPEED | X1 |
| UNPLAYED SIZE | 10MB |

FIG. 3

DRIVE INFORMATION

| DRIVE ID | TOTAL CAPACITY | REMAINING CAPACITY |
|---|---|---|
| DRIVE(1) | 6GB | 0GB |
| DRIVE(2) | 10GB | 0GB |
| DRIVE(3) | 10GB | 8GB |

FIG. 4A

VIDEO/AUDIO DATA MANAGEMENT
INFORMATION OF DATA(1)

| CONTENT ID | 20060726.1 |
|---|---|
| NUMBER OF SEGMENTS | 1 |
| PLAYBACK ORDER | 1 |
| DRIVE ID | DRIVE(1) |
| SIZE | 2GB |
| BIT RATE | 5Mbps |

FIG. 4B

VIDEO/AUDIO DATA MANAGEMENT
INFORMATION OF DATA(2)

| CONTENT ID | 20060726.2 |
|---|---|
| NUMBER OF SEGMENTS | 2 |
| PLAYBACK ORDER | 1 |
| DRIVE ID | DRIVE(1) |
| SIZE | 4GB |
| BIT RATE | 5Mbps |

FIG. 4C

VIDEO/AUDIO DATA MANAGEMENT
INFORMATION OF DATA(3)

| CONTENT ID | 20060726.2 |
|---|---|
| NUMBER OF SEGMENTS | 2 |
| PLAYBACK ORDER | 2 |
| DRIVE ID | DRIVE(2) |
| SIZE | 4GB |
| BIT RATE | 5Mbps |

FIG. 4D

VIDEO/AUDIO DATA MANAGEMENT
INFORMATION OF DATA(4)

| CONTENT ID | 20060726.3 |
|---|---|
| NUMBER OF SEGMENTS | 2 |
| PLAYBACK ORDER | 1 |
| DRIVE ID | DRIVE(2) |
| SIZE | 6GB |
| BIT RATE | 2Mbps |

FIG. 4E

VIDEO/AUDIO DATA MANAGEMENT
INFORMATION OF DATA(5)

| CONTENT ID | 20060726.3 |
|---|---|
| NUMBER OF SEGMENTS | 2 |
| PLAYBACK ORDER | 2 |
| DRIVE ID | DRIVE(3) |
| SIZE | 2GB |
| BIT RATE | 2Mbps |

PLURAL DRIVE DEVICE DELAY COUNTERMEASURE AND RECORDING/REPRODUCTION DEVICE PERFORMING POWER SAVING CONTROL

TECHNICAL FIELD

The present invention relates to control of drive devices included in a recording/playback apparatus.

BACKGROUND ART

In recent years, the storage capacities of recording media, such as hard disks and DVDs have been increased. Accordingly, recording/playback apparatuses that use such recording media for recording video/audio data of contents, such as TV programs, have been developed and come into wide use. As the transition to the digital terrestrial broadcasting progresses, it is likely that the bit rate of the streams increases and the demand for increasing the capacities of recording media becomes greater. In the case of particularly using a hard disk as a recording medium in an apparatus, it is more common to use plural low-cost middle-capacity hard disks than to use a large-capacity hard disk.

To perform playback or recording with a recording medium such as a hard disk and a DVD, it is necessary to start driving the spindle motor in advance. However, if plural hard disks are provided as recording media and the spindle motors of the hard disks are always being driven, a considerable amount of electrical power is required. On the other hand, if the spindle motor is driven each time an access to the hard disk is required, it requires quite a long time before the spindle motor drives and the hard disk becomes accessible. As a result, it might happen at playback that data to be transmitted to the decoder can not be read in time. This results in interruptions of the playback. Also, at recording, it might happen that the buffer used for storing data to be recorded on the hard disk overflows. This results in partial missing of the recorded data.

To solve such problems, Patent Document 1 identified below discloses an invention that has become part of the public domain.

The Patent Document 1 discloses a recording/playback apparatus that is equipped with a hard disk and a semiconductor recording device. According to this disclosure, when recording video/audio data on the hard disk, the recording/playback apparatus records the top part of the video/audio data on the semiconductor recording device while recording all the video/audio data on the hard disk. When playing back the video/audio data, the recording/playback apparatus first plays back the top part of the video/audio data recorded on the semiconductor recording device, and starts driving the spindle motor of the hard disk during the playback. Then, the recording/playback apparatus plays back the rest of the video/audio data from the hard disk. As a result, it is possible to prevent delay of the playback.

Patent Document 1: Japanese Laid-open Patent Application Publication No. 2005-302276

DISCLOSURE OF THE INVENTION

Problem to be Solved by the Invention

However, the recording/playback apparatus disclosed in the Patent Document 1 above has a problem that it is necessary to be provided with a semiconductor recording device and this hinders the improvement of the cost performance that is caused by being equipped with plural low-cost middle-capacity hard disks. In particular, if the bit rate is increased by the digital terrestrial broadcasting, or if the number of hard disks that the recording/playback apparatus can be equipped with is increased, it is necessary for the recording/playback apparatus to be equipped with a high-cost large-capacity semiconductor recording device.

The object of the present invention is to provide a recording/playback apparatus that uses a plurality of low-cost middle-capacity hard disks to realize high performance at the same level as recording/playback apparatuses equipped with a large-capacity hard disk, and reduce power consumption.

Means for Solving the Problem

To solve the problem mentioned above, one aspect of the recording/playback apparatus pertaining to the present invention is a playback apparatus that performs sequential playback by reading a plurality of video/audio data segments from a plurality of recording media each driven by a different one of drive devices, the playback apparatus comprising: a calculation unit operable to calculate a remaining time until completion of reading of one of the video/audio data segments that is being played back as a current playback target, before the completion of the reading; and a state control unit operable to put, into a power-saving state, any of the drive devices other than one that drives a recording medium that stores the current playback target, wherein if the remaining time is equal to a prescribed time, the state control unit puts, into a stand-by state from the power-saving state, one of the drive devices that drives a recording medium that stores another one of the video/audio data segments that is to be played back subsequently to the current playback target as a next playback target. Another aspect of the recording/playback apparatus pertaining to the present invention is a recording apparatus that performs sequential recording by writing a plurality of video/audio data segments onto a plurality of recording media each driven by a different one of drive devices, the recording apparatus comprising: a calculation unit operable to calculate a remaining time until completion of recording of one of the video/audio data segments that is being recorded as a current recording target, before the completion of the recording; and a state control unit operable to put, into a power-saving state, any of the drive devices other than one that drives a recording medium onto which the current recording target is being recorded, wherein if the remaining time is equal to a prescribed time, the state control unit puts, into a stand-by state from the power-saving state, one of the drive devices that drives a recording medium onto which a next recording target is to be recorded, the next recording target being another one of the video/audio data segments that is to be recorded subsequently to the current recording target.

Advantageous Effects of the Present Invention

With the stated structures, during the sequential playback or the sequential recording, before completion of current recording/reading onto/from a recording medium driven by one drive device, it is possible to prepare another drive device that drives a recording medium onto/from which the video/audio data segment is to be recorded/read next. Accordingly, even if the spin-up of the drive device takes a long time, the sequential reading from the recording medium or the sequential recording onto the recording medium will not be interrupted. The recording/playback apparatus can use a plurality of drive devices without interruption of the reading and the writing. This means that it is possible to move forward to reduce the cost of the recording/playback apparatus while keeping the performance of the recording/playback apparatus.

The recording media may be driven by the drive devices are disk media, and the state control unit may instruct the one of the drive devices that drives the recording medium that stores the next playback target to spin up a disk medium thereof in order to put the one of the drive devices into the stand-by mode With the stated structure, it is possible to realize the sequential reading without interruption, by spinning up a disk medium in advance before it becomes necessary to read data from the disk medium.

When the reading of the current playback target is completed and reading of the next playback target is started, the state control unit may put, into the power-saving state, the one of the drive devices that drives the recording medium from which the current playback target has been read completely.

With the stated structure, the drive device that has completed the reading is put into the power-saving state. Accordingly, it is unnecessary to use extra power by driving the spindle motor all the time. This means that it is possible to realize a playback apparatus with low power consumption.

The calculation unit may calculate the remaining time based on a size of a remaining part of the current playback target that has not been played back, and a bit rate used for the playback of the current playback target, and the prescribed time may correspond to a time required for spinning up the recording medium that stores the next playback target.

With the stated structure, the playback apparatus can calculate the remaining time until completion of reading of the current playback target from the disk medium, based on the bit rate and the size of the remaining part of the current playback target that has not been played back, that is, the unplayed size. As a result, it is possible to prepare the access to the disk medium that stores the video/audio data segment as the next playback target, according to the time at which the access to the disk medium is required. Therefore, the playback apparatus can avoid consuming extra power.

The plurality of video/audio data segments may have been generated by dividing a single content.

With the stated structure, when reading a plurality of video/audio data segments generated by dividing a single content, the playback apparatus reads each of the video/audio data segments from the recording media driven by the drive devices. Therefore, the playback apparatus can reads the content in the same manner as the case of reading from a large-capacity recording medium driven by a single drive device. The playback apparatus can perform the playback without making the user aware of that the content has been separately recorded on the plurality of recording media.

The recording media driven by the drive devices may be disk media, and the state control unit may instruct the one of the drive devices that drives the recording medium onto which the next recording target is to be recorded to spin up a disk medium thereof in order to put the one of the drive devices into the stand-by mode.

With the stated structure, it is possible to realize the sequential recording without interruption, by spinning up a disk medium in advance before it becomes necessary to write data on the disk medium.

When the recording of the current recording target is completed and recording of the next recording target is started, the state control unit may put, into the power-saving state, the one of the drive devices that drives the recording medium on which the current recording target has been recorded completely.

With the stated structure, the drive device that has completed the recording is put into the power-saving state. Accordingly, it is unnecessary to use extra power by driving the spindle motor all the time. This means that it is possible to realize a recording apparatus with low power consumption.

The calculation unit may calculate the remaining time based on a remaining capacity of the recording medium onto which the current recording target is being recorded and a bit rate used for the recording of the current recording target, and the prescribed time may correspond to a time required for spinning up the recording medium onto which the next recording target is to be recorded With the stated structure, the recording apparatus can calculate the remaining time until completion of recording of the current recording target onto the disk medium, based on the bit rate and the size of the remaining part of the current recording target that has not been recorded, that is, the unrecorded size. As a result, it is possible to prepare the access to the disk medium onto which the video/audio data segment as the next playback target is to be recorded, according to the time at which the access to the disk medium is required. Therefore, the recording apparatus can avoid consuming extra power.

The plurality of video/audio data segments may have been generated by dividing a single content.

With the stated structure, when recording a plurality of video/audio data segments generated by dividing a single content, the recording apparatus records each of the video/audio data segments onto the recording media driven by the drive devices. Therefore, the recording apparatus can record the content in the same manner as the case of recording onto a large-capacity recording medium driven by a single drive device. The recording apparatus can perform the recording without making the user aware of that the content is separately recorded on the plurality of recording media.

BRIEF DESCRIPTION OF THE DRAWINGS

FIG. 2 shows an example of video/audio data information held by a control unit 200 of the recording/playback apparatus pertaining to the present invention;

FIG. 3 shows an example of drive information held by the control unit 200 of the recording/playback apparatus pertaining to the present invention;

FIG. 4A to FIG. 4E show examples of video/audio data management information held by the control unit 200 of the recording/playback apparatus pertaining to the present invention;

EXPLANATION OF REFERENCES

Figure 1:
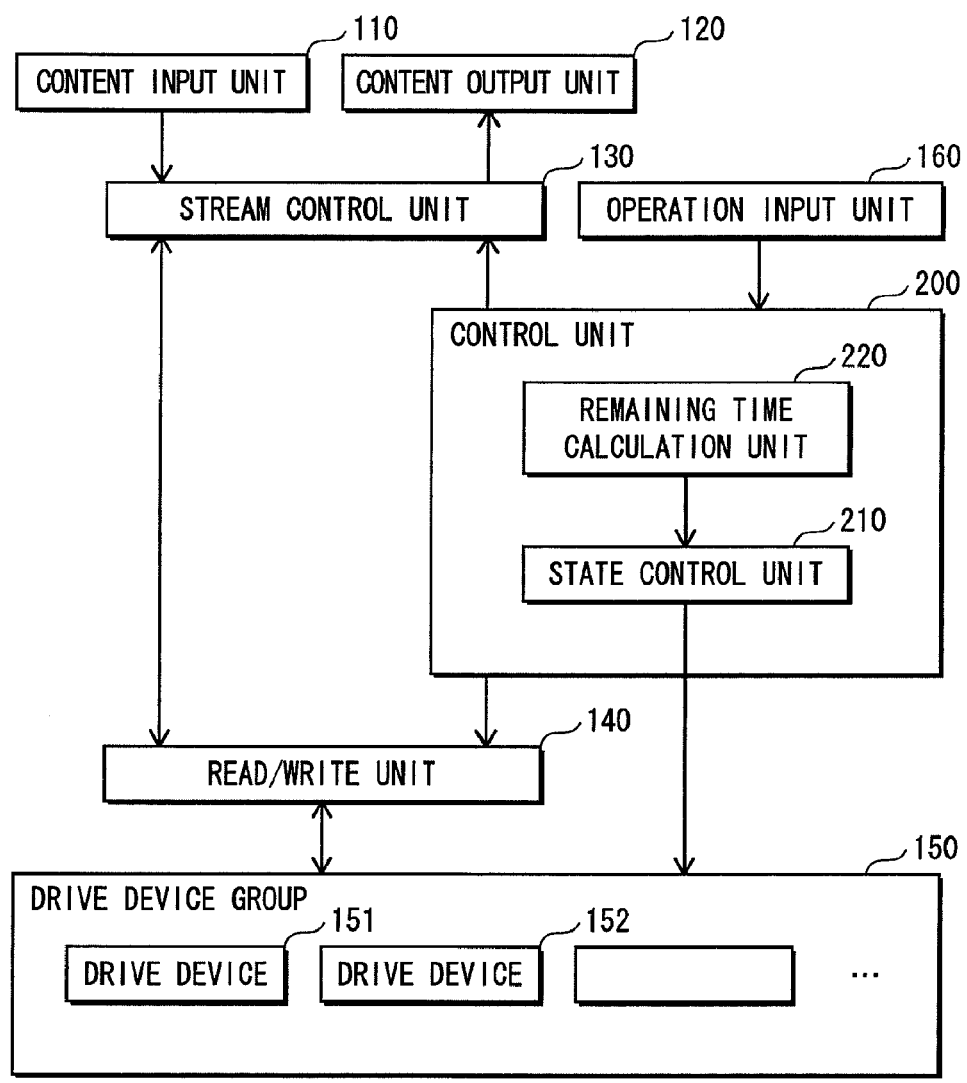
FIG. 1 is a block diagram showing an embodiment of a recording/playback apparatus pertaining to the present invention.

110: Content input unit
120: Content output unit
130: Stream control unit
140: Read/write unit
150: Drive device group
151, 152: Drive devices
160: Operation input unit
200: Control unit
210: State control unit
220: Remaining time calculation unit

BEST MODE FOR CARRYING OUT THE INVENTION

First Embodiment

Structure

A block diagram of a recording/playback apparatus pertaining to the first embodiment of the present invention is illustrated in FIG. 1. The recording/playback apparatus pertaining to the first embodiment of the present invention includes a content input unit 110, a content output unit 120, a stream control unit 130, a read/write unit 140, a drive device group 150, an operation input unit 160, and a control unit 200.

The content input unit 110 is a unit from which video/audio data, as a content to be recorded on recording media driven by the drive device group 150, is input. The content input unit 110 transmits the input video/audio data to the stream control unit 130. The content input unit 110 is embodied as, for example, a tuner for receiving broadcast signals or a device for receiving video/audio data via the Internet.

The content output unit 120 is a unit from which video/audio data, as a content that has been recorded on the recording media driven by the drive device group 150, is output. The content output unit 120 receives the video/audio data to be output, from the stream control unit 130. The content output from the content output unit 120 is transmitted to, for example, a video/audio playback device structured from an MPEG decoder and a display and a speaker connected thereto, or a device for receiving video/audio data via the Internet.

The stream control unit 130 controls, for example, the flow of the video/audio data, and operations of format conversion.

The read/write unit 140 performs reading and writing of data on the recording media driven by the drive device group 150.

The drive device group 150 is constituted of a plurality of drive devices, such as the drive device 151 and the drive device 152, which drive a plurality of recording media on which video/audio data is recordable. The drive device 151 and the drive device 152 are embodied as, for example, drive devices that use disk media such as hard disks and DVDs as the recording media.

The operation input unit 160 receives an instruction from a user, and transmits the received instruction to the control unit 200 to, for example, start and stop operations of the recording/playback apparatus. The operation input unit 160 is embodied as, for example, an input device that is provided with buttons and so on for receiving user's operations.

The control unit 200 is a unit for controlling various kinds of operations of the drive device group 150, and includes a state control unit 210 and a remaining time calculation unit 220. The control unit 200 receives a content playback request input by the user from the operation input unit 160, and requests the read/write unit 140 to read video/audio data, as a segment of the requested content, from the recording media driven by the drive device group 150. Then, the control unit 200 requests the stream control unit 130 to output the read video/audio data from the content output unit 120. The control unit 200 holds video/audio data information and drive information. As FIG. 2 shows, the video/audio data information includes, for example, an identifier of video/audio data that is currently being played back, a total size, a bit rate, a playback direction, a playback speed, and an unplayed size which is a size obtained by subtracting the size of the part of the video/audio data that has been already played back from the total size of the video/audio data. As FIG. 3 shows, the drive information includes, for example, total capacities and remaining capacities of the recording media driven by the drive devices.

Figure 5:
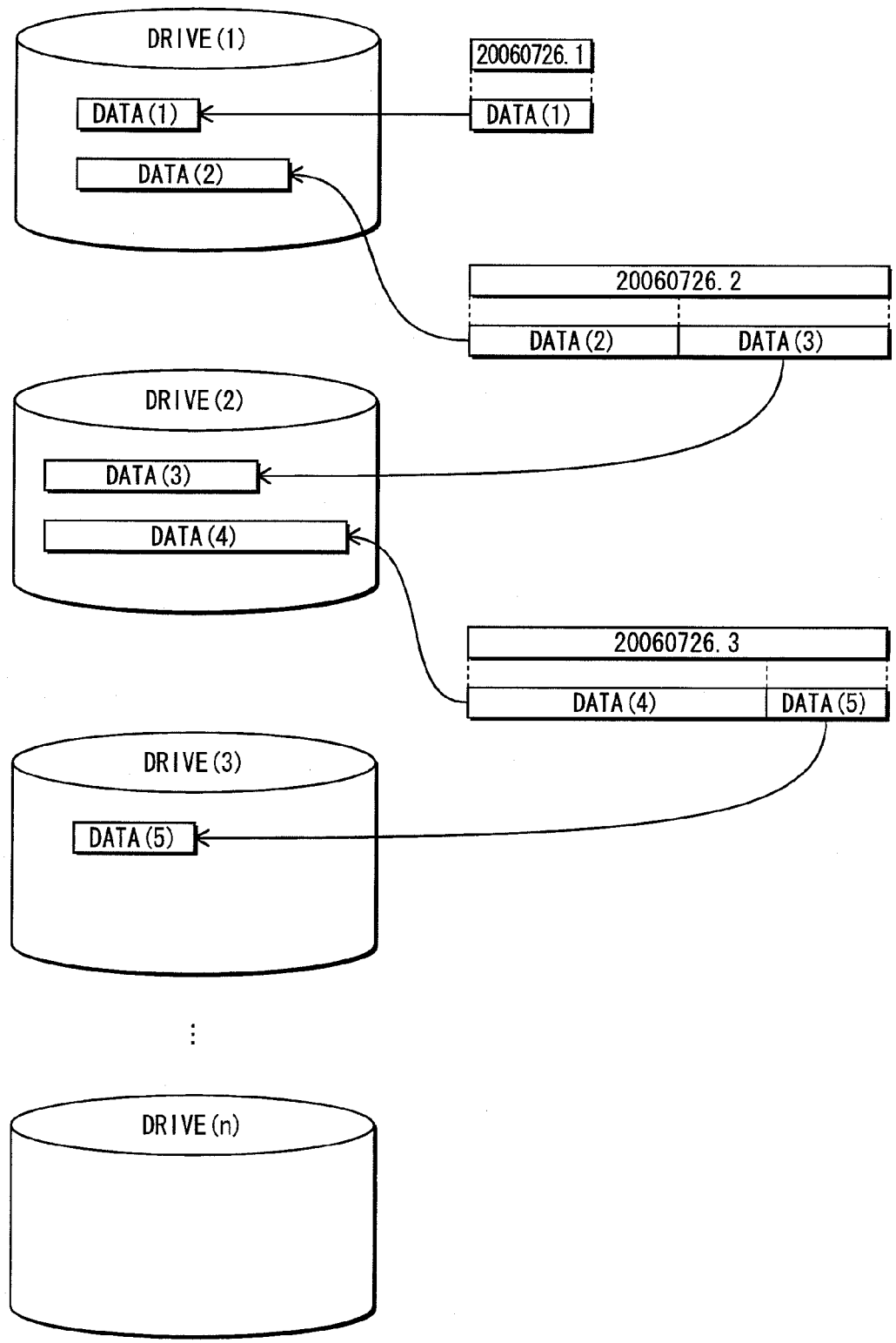
FIG. 5 is a conceptual diagram showing arrangement of contents recorded on a drive device group 150 of the recording/playback apparatus pertaining to the present invention.

To playback a single content that is recorded as a plurality of video/audio data segments on the plurality of recording media driven by the plurality of drive devices, the control unit 200 handles video/audio data segments to each of which video/audio data management information is attached. This video/audio data management information is attached by the control unit 200 at the time of recording. As FIG. 4 shows, the video/audio data management information includes, for example, an identifier of a content from which the video/audio data segment is divided, the number of the video/audio data segments, a playback order among the video/audio data segments, an identifier of the drive device that drives the recording medium that stores the video/audio data segment, and a size and a bit rate of the video/audio data segment. In the example shown in FIG. 4, three contents, namely 20060726.1, 20060726.2, and 20060726.3 are divided into segments and recorded on the recording media driven by three drive devices, namely DRIVE(1), DRIVE(2), and DRIVE(3). This is illustrated in the conceptual diagram of FIG. 5. The content 20060726.1 is constituted of a single video/audio data segment namely DATA(1), and recorded on the DRIVE(1). The content 20060726.2 is constituted of two video/audio data segments namely DATA(2) and DATA(3), and recorded on the DRIVE(1) and the DRIVE(2). The content 20060726.3 is constituted of two video/audio data segments namely DATA(4) and DATA(5), and recorded on the DRIVE(2) and the DRIVE(3).

The control unit 200 plays back a series of contents requested by the user, based on the video/audio data management information. The control unit 200 judges whether the content, which includes the video/audio data segment that is currently being played back, includes another video/audio data segment, before the playback of the current video/audio data segment completes. If the content does, the control unit 200 determines the video/audio data segment to be played back next, according to the playback order recorded in the video/audio data management information. If not, the control unit 200 determines the top segment of the content to be played back next according to the user's request, as the video/audio data to be played back next.

The state control unit 210 performs power-saving management for the drive devices, depending on the video/audio data to be played back next. For example, if the video/audio data that is currently being played back is recorded on the recording medium driven by the drive device 151 and the video/audio data that has been determined as the data to be played back next is recorded on the recording medium driven by the drive device 152 and the drive device 152 is not in the stand-by state, the state control unit 210 makes a request for starting the access preparation operation such that the drive device 152 comes into the stand-by state at the time the currently progressing playback of the video/audio data completes. Here, the stand-by state is a state in which the disk medium is accessible. The access preparation operation is, for example, driving of the spindle motor and initialization of head-driving devices for the motor. The state control unit 210 puts the drive device 151 into a power-saving state when the playback of the video/audio data recorded on the recording medium driven by the drive device 151 completes and the playback of the video/audio data segment recorded on the recording medium driven by the drive device 152 starts. Here, the power-saving state is a state in which, for example, the spindle motor is stopped, and the power supply to the servo circuit and other circuits is stopped.

The remaining time calculation unit 220 calculates the remaining playback time of the video/audio data segment that is currently being played back, such that the drive device 152 can be put into the stand-by state at the time the playback of the video/audio data segment completes. For example, the remaining time calculation unit 220 calculates the remaining time based on the bit rate and the unplayed size of the video/audio data that is being played back. Here, note that the playback speed must be taken into consideration when the playback is double speed, triple speed, etc.

<Playback Operations>

Next, the playback operations performed by the recording/playback apparatus pertaining to the first embodiment of the present invention are described. The following explains a case of playing back the content 20060726.2 among the three contents which are constituted of the five video/audio data segments illustrated in FIG. 4 and stored in the recording/playback apparatus.

Figure 6:
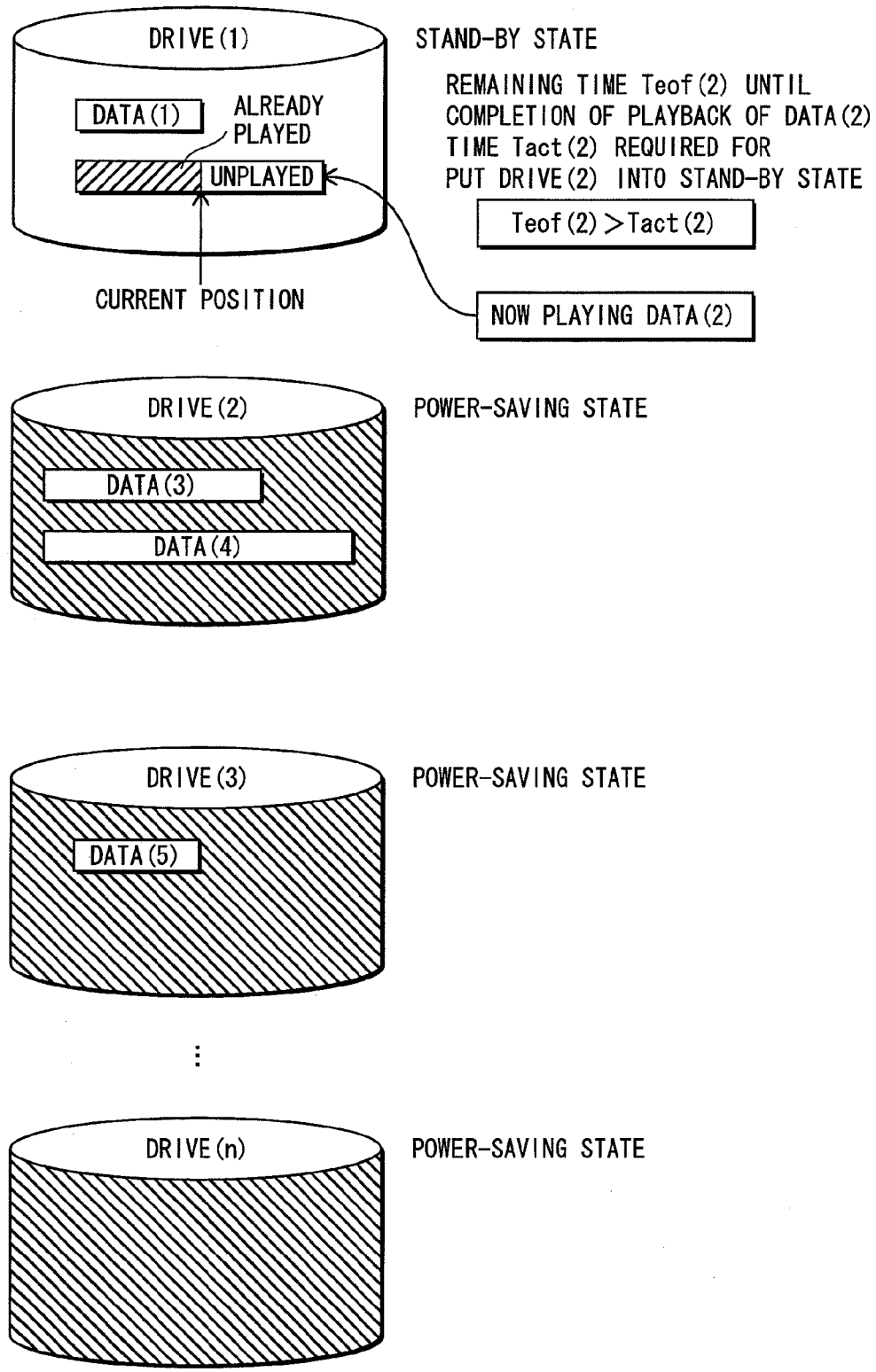
FIG. 6 shows usage states of drive devices before a start of an access preparation operation, which is included in playback operations pertaining to the first embodiment of the present invention.

First, the control unit 200 puts the drive device DRIVE(1) into the stand-by state, and plays back the video/audio data segment DATA(2). The drive device DRIVE(1) is the device that drives the recording medium that stores the video/audio data segment DATA(2), which is the first segment of the content 20060726.2. As FIG. 6 shows, the other drive devices DRIVE(i) (i=2, 3, . . . , n) are in the power-saving state during the playback of the video/audio data segment DATA(2). Since there is the video/audio data segment DATA(3), which is included in the same content 20060726.2 as the video/audio data segment DATA(2) and to be played back next, the control unit 200 acquires a Tact(2). The Tact(2) is the time required for putting the drive device DRIVE(2) into the stand-by state. The drive device DRIVE(2) is the device that drives the recording medium that stores the video/audio data segment DATA(3). The recording/playback apparatus continues the normal playback as long as a time Teof(2) is longer than the time Tact(2). Here, the time Teof(2) is a value that has been calculated by the remaining time calculation unit 220 and indicates the remaining time until the playback completion of the video/audio data segment DATA(2).

Figure 7:
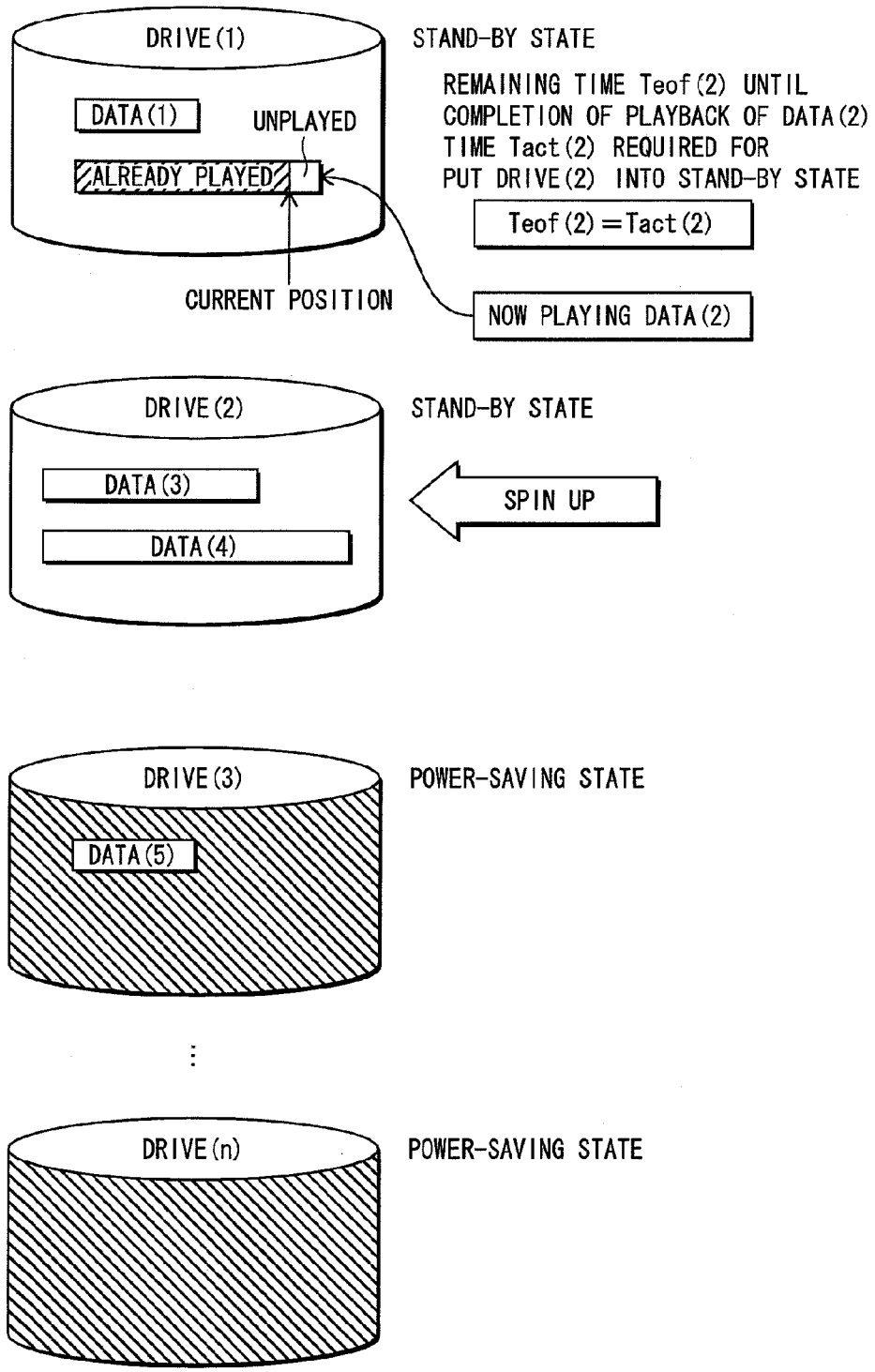
FIG. 7 shows usage states of drive devices after spin up operation of a drive device that is to be accessed next, which is included in the playback operations pertaining to the first embodiment of the present invention.

As the playback progresses and the time Teof(2) becomes equal to the time Tact(2), the state control unit 210 starts the access preparation operation for the drive device DRIVE(2) to spin up the drive device DRIVE(2). As FIG. 7 shows, the drive devices DRIVE(1) and DRIVE(2) are in the stand-by state until the playback of the video/audio data segment DATA(2) completes.

Figure 8:
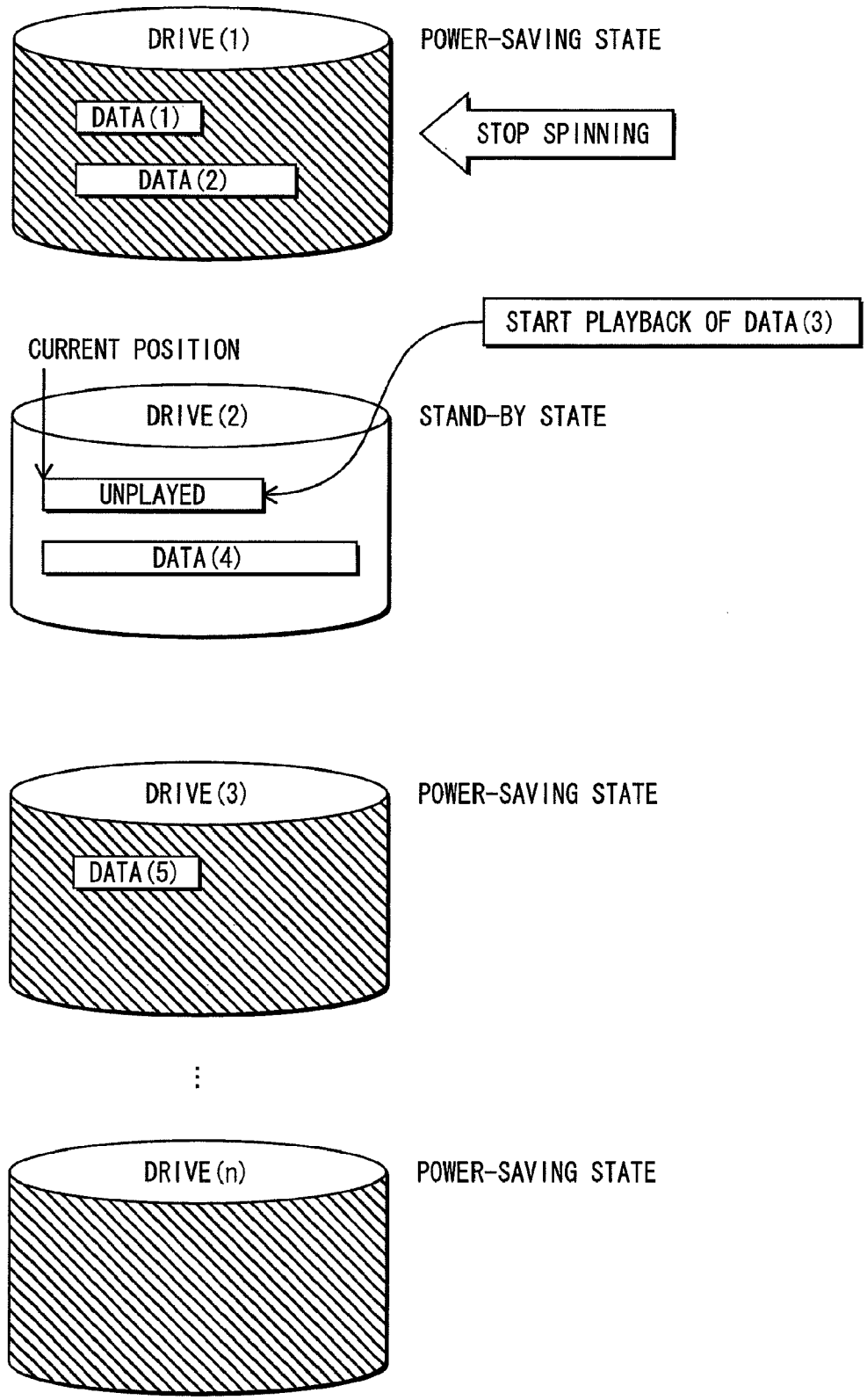
FIG. 8 shows usage states of drive devices after spin up operation of a drive device that has been accessed previously, which is included in the playback operations pertaining to the first embodiment of the present invention.

Upon completion of the playback of the video/audio data segment DATA(2), the state control unit 210 puts the drive device DRIVE(1) into the power-saving state to stop the spinning of the DRIVE(1). After that, the control unit 200 starts playback of the video/audio data segment DATA(3) as FIG. 8 shows.

Figure 9:
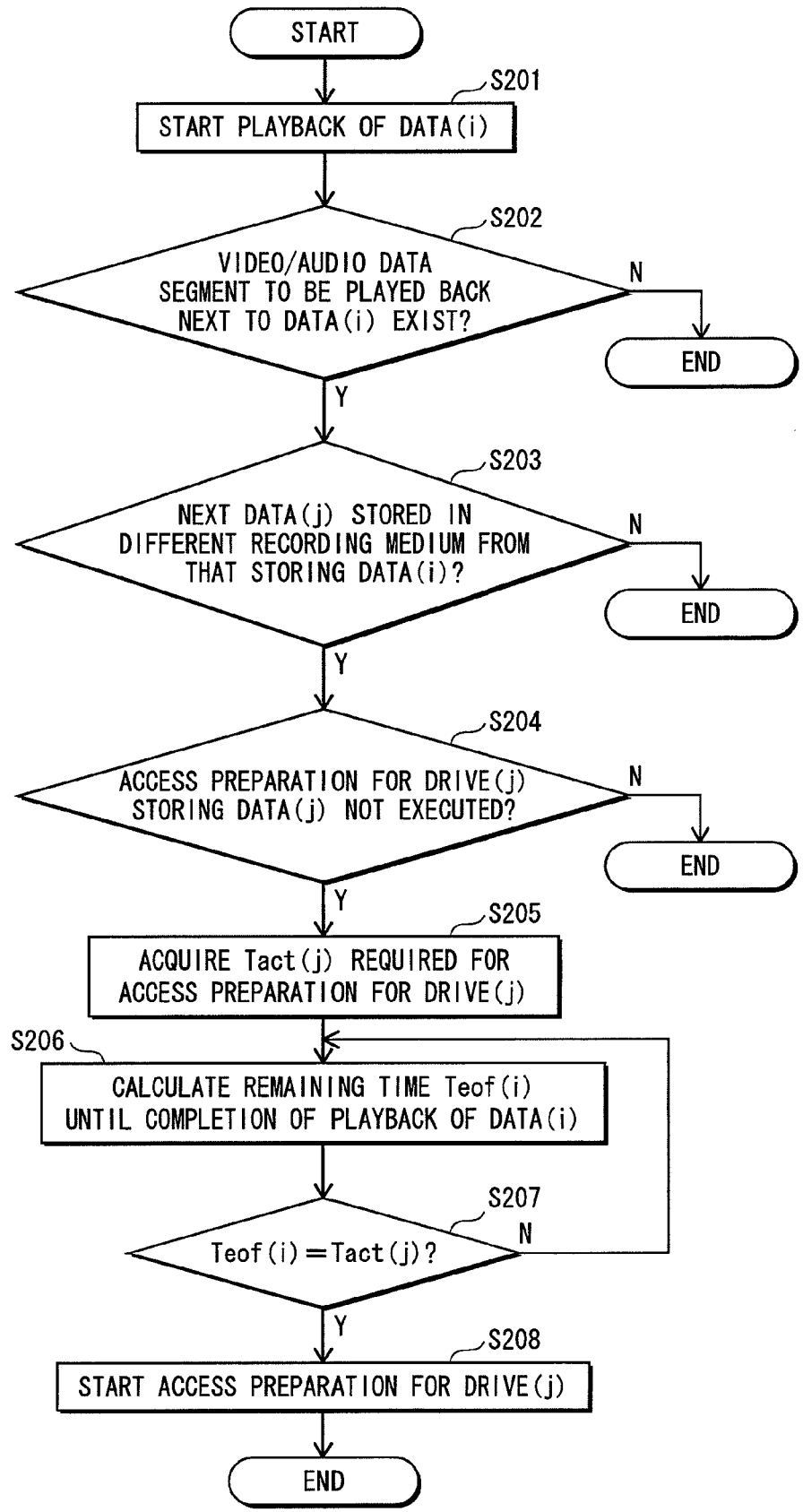
FIG. 9 is a flowchart showing the playback operations pertaining to the first embodiment of the present invention.

The playback operation of the recording/playback apparatus described above is explained next with reference to a flowchart shown in FIG. 9. FIG. 9 shows the case of sequentially playing back n video/audio data segments DATA(i) (i=1, 2, . . . , n) selected by the user from among a plurality of video/audio data segments recorded on the recording media driven by the drive device group 150. FIG. 9 explains operations for starting the access preparation operation for a video/audio data segment DATA(j) that is to be played back next, during the playback of the $i^{th}$ video/audio data segment DATA (i).

It is assumed in FIG. 9 that the playback of the video/audio data segment DATA(i), requested by the user, has been started (S201).

If there is no video/audio data segment to be played back immediately next to the video/audio data segment DATA(i) (S202 N), the recording/playback apparatus simply continues the normal playback (not clearly specified in the flowchart).

If there is the video/audio data segment DATA(j) that is to be played back immediately next to the video/audio data segment DATA(i) (S202 Y), the recording/playback apparatus judges whether the drive device DRIVE(i) that drives the recording medium on which the video/audio data segment DATA(i) is recorded and the drive device DRIVE(j) that drives the recording medium on which the video/audio data segment DATA(j) is recorded are different (S203). If the DRIVE(i) is the same as the DRIVE(j) (S203 N), the recording/playback apparatus continues the normal playback (not clearly specified in the flowchart).

If the DRIVE(i) is different from the DRIVE(j) (S203 Y), the recording/playback apparatus judges whether the drive device DRIVE(j), which drives the recording medium on which the video/audio data segment DATA(j) is recorded, is in the stand-by state (S204).

If the drive device DRIVE(j) is in the stand-by state (S204 N), the recording/playback apparatus continues the normal playback (not clearly specified in the flowchart).

If the drive device DRIVE(j) is not in the stand-by state (S204 Y), the recording/playback apparatus acquires a time Tact(j), which is a time required for putting the drive device DRIVE(j) into the stand-by state (S205).

The recording/playback apparatus calculates a time Teof (i), which is a remaining time until the completion of the playback of the video/audio data segment DATA(i) (S206).

The recording/playback apparatus judges whether the time Teof(i) and the time Tact(j) are the same (S207), and if they are not the same (S207 N), repeats the steps from the step S206 until they become the same. Here, the judgment as to whether the time Teof(i) and the time Tact(j) are the same may be performed flexibly. For example, when a difference calculated by subtracting the time Tact(j) from the time Teof(i) is smaller than a prescribed value (e.g. 1 second), the recording/playback apparatus may judge that they are the same.

If the time Teof(i) and the time Tact(j) are the same (S207 Y), the recording/playback apparatus starts the access preparation operation for the drive device DRIVE(j) (S208), and continues the normal playback.

According to these operations, it is possible to put a drive device that derives a recording medium on which a video/audio data segment to be played back next is recorded into the stand-by state, before completion of playback of a video/audio data segment that is currently progressing, even if the video/audio data segments are recorded on different drive devices. At the same time as the playback start time of the video/audio data segment to be played back next, the access preparation operation for the drive device that drives the recording medium on which the video/audio data segment is recorded completes. Therefore, the recording/playback apparatus can seamlessly continue the playback without consuming extra power.

Second Embodiment

Structure

The following explains a recording/playback apparatus pertaining to the second embodiment of the present invention. The overall structure of the recording/playback apparatus pertaining to the second embodiment is the same as FIG. 1. In the following explanation, only differences of the case of recording from the case of playback.

The control unit 200 receives a user's request for recording a content, input from the operation input unit 160. The control unit 200 requests the stream control unit 130 to retrieve video/audio data of the requested content from the content input unit 110, and requests the read/write unit 140 to write the retrieved video/audio data onto the recording media driven by the drive device group 150.

The control unit 200 attaches the video/audio data management information to the content. As a result, even if a free space of the recording medium driven by the drive device that performs the recording runs out and remaining video/audio data segments of the content is recorded onto a different recording medium driven by the next drive device, all the video/audio data segments can be totally managed as a single content. For example, the control unit 200 records as the video/audio data management information, an identifier of a content that is being recorded, the number of the video/audio data segments, a playback order among the video/audio data segments, an identifier of the drive device that drives the recording medium that stores the video/audio data segment, and a size and a bit rate of the video/audio data segment. The control unit 200 holds the video/audio data management information as a table illustrated in FIG. 4 for example.

The state control unit 210 performs power-saving management according to the size of the remaining free space on which the recording is being performed. For example, assume a case where a video/audio data segment is being recorded on the recording medium driven by the drive device 151 and it is expected that the remaining free space of the recording medium will run out, and the drive device 152 that drives the next recording medium is not in the stand-by state. In such a case, the state control unit 210 makes a request for the access preparation operation such that the drive device 152 comes into the stand-by state at the time the free space of the recording medium driven by the drive device 151 runs out. Also, the state control unit 210 puts the drive device 151 into the power-saving state when the recording of the video/audio data segment onto the recording medium driven by the drive device 151 completes and the recording onto the recording medium driven by the drive device 152 starts.

The remaining time calculation unit 220 calculates the remaining time for which the data can be recorded on the recording medium onto which the video/audio data segment is currently being recorded, such that the state control unit 210 puts the drive device 152 into the stand-by state at the time the free space of the recording medium onto which the video/audio data segment is currently being recorded runs out. The remaining time calculation unit 220 calculates the remaining time by dividing the size of the free space of the recording medium, onto which the video/audio data segment is currently being recorded, by the bit rate of the video/audio data segment.

<Recording Operations>

Next, the recording operations performed by the recording/playback apparatus pertaining to the second embodiment of the present invention are described next. The following explains a case of recording the content 20060726.2 after completion of the recording of the content 20060726.1, among the three contents which are constituted of the five video/audio data segments illustrated in FIG. 4 and stored in the recording/playback apparatus.

Figure 10:
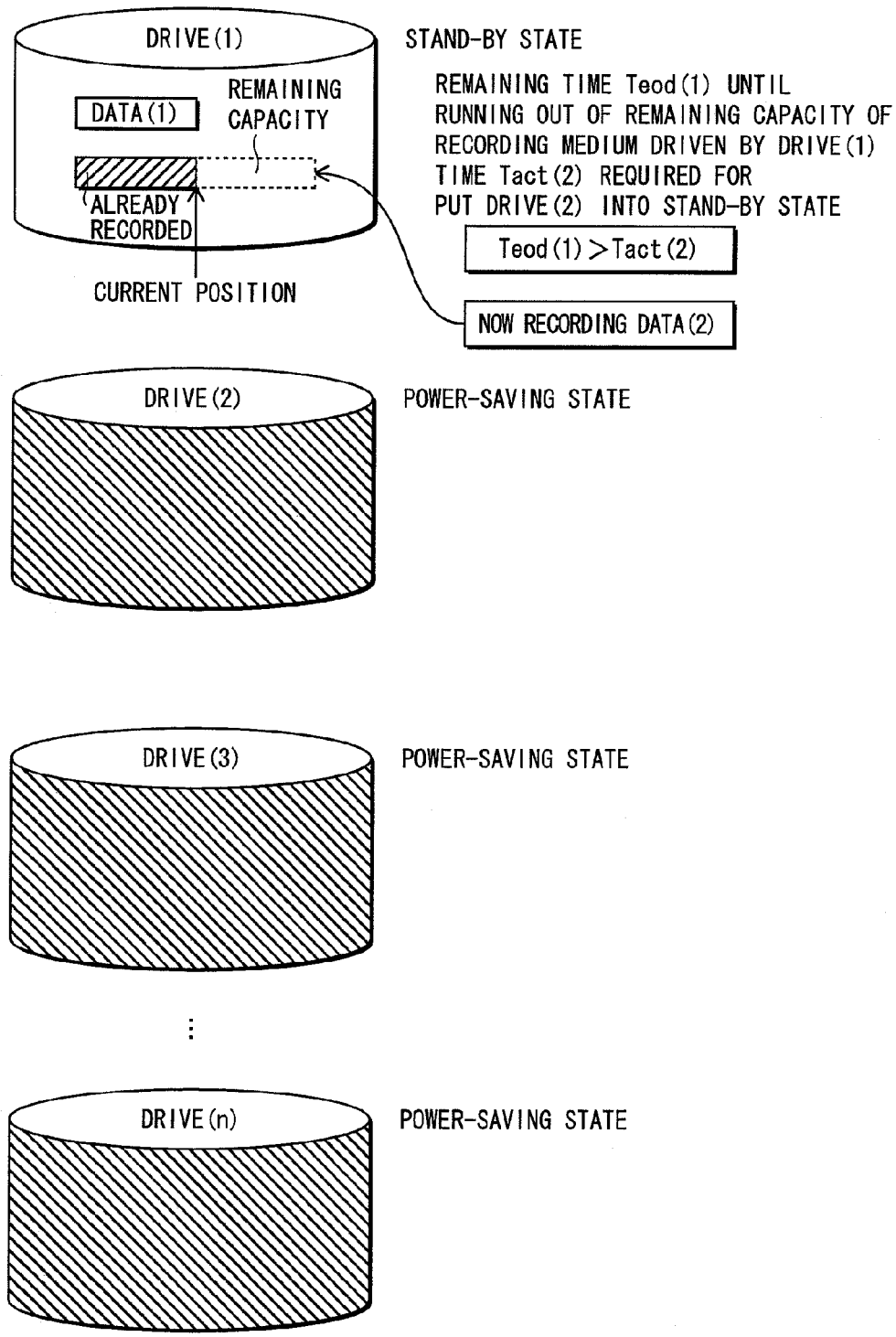
FIG. 10 shows usage states of drive devices before a start of an access preparation operation, which is included in recording operations pertaining to the second embodiment of the present invention.

First, the control unit 200 records the video/audio data segment DATA(2) of the content 20060726.2 onto the drive device DRIVE(1), because there is a free space in the drive device DRIVE(1). As FIG. 10 shows, during the recording of the video/audio data segment DATA(2), the other drive devices DRIVE(i) (i=2, 3, . . . , n) are in the power-saving state. The control unit 200 acquires the time Tact(2), which is a time required for putting the drive device DRIVE(3) into the stand-by state. The drive device DRIVE(3) is a device that drives the recording medium that has a free space and is the recording target after the drive device DRIVE(1) onto which the video/audio data segment DATA(2) is being recorded. The recording/playback apparatus continues the normal recording as long as a time Teod(1) is longer than the time Tact(2). Here, the time Teod(1) is a value that has been calculated by the remaining time calculation unit 220 and indicates the remaining time until the running out of the free space of the recording medium driven by the drive device DRIVE(1).

Figure 11:
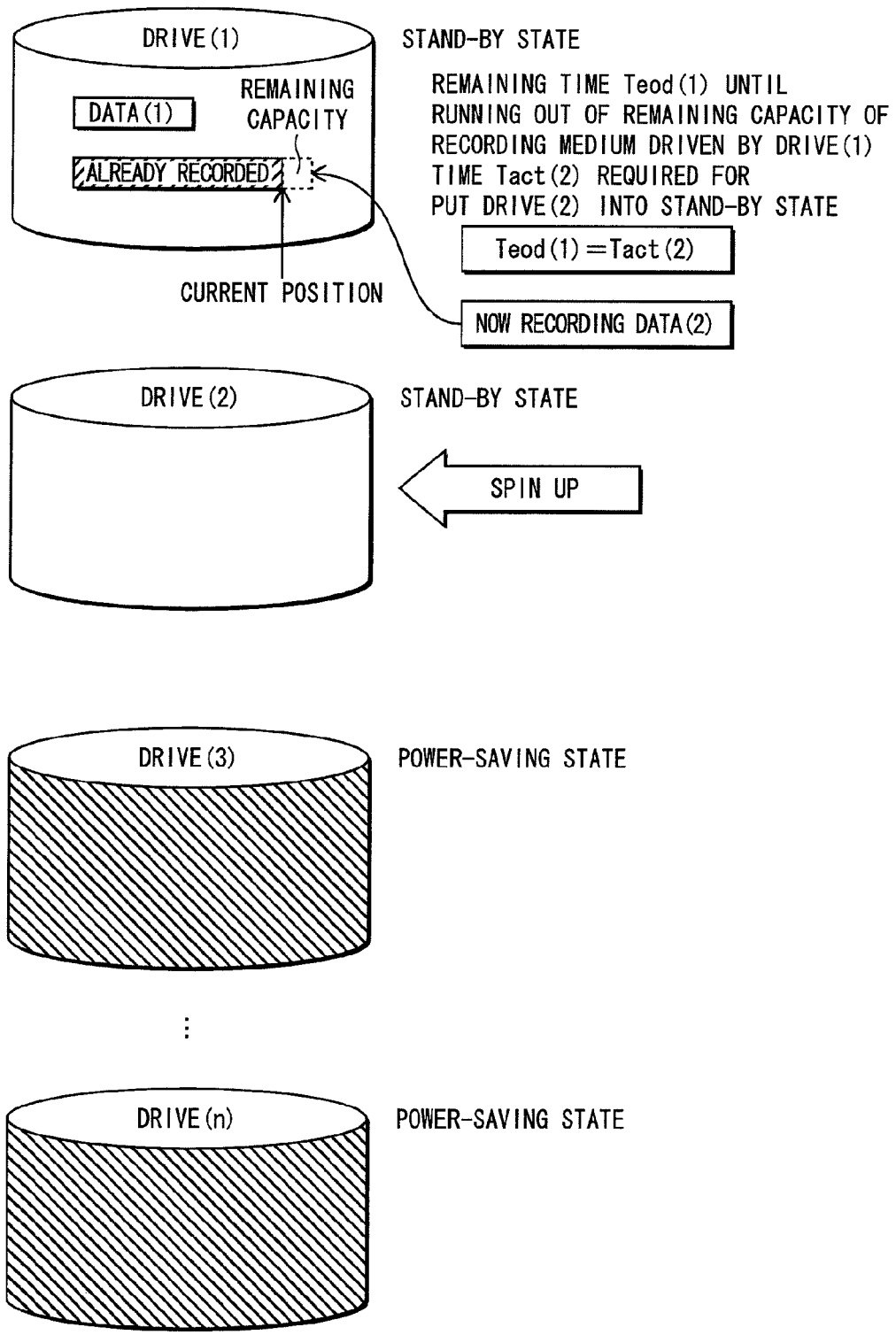
FIG. 11 shows usage states of drive devices after spin up operation of a drive device that is to be accessed next, which is included in the recording operations pertaining to the second embodiment of the present invention.

As the recording progresses and the time Teod(1) becomes equal to the time Tact(2), the state control unit 210 starts the access preparation operation for the drive device DRIVE(2) to spin up the drive device DRIVE(2). As FIG. 11 shows, the drive devices DRIVE(1) and DRIVE(2) are in the stand-by state until the free space of the recording medium driven by the drive device DRIVE(1) runs out.

Figure 12:
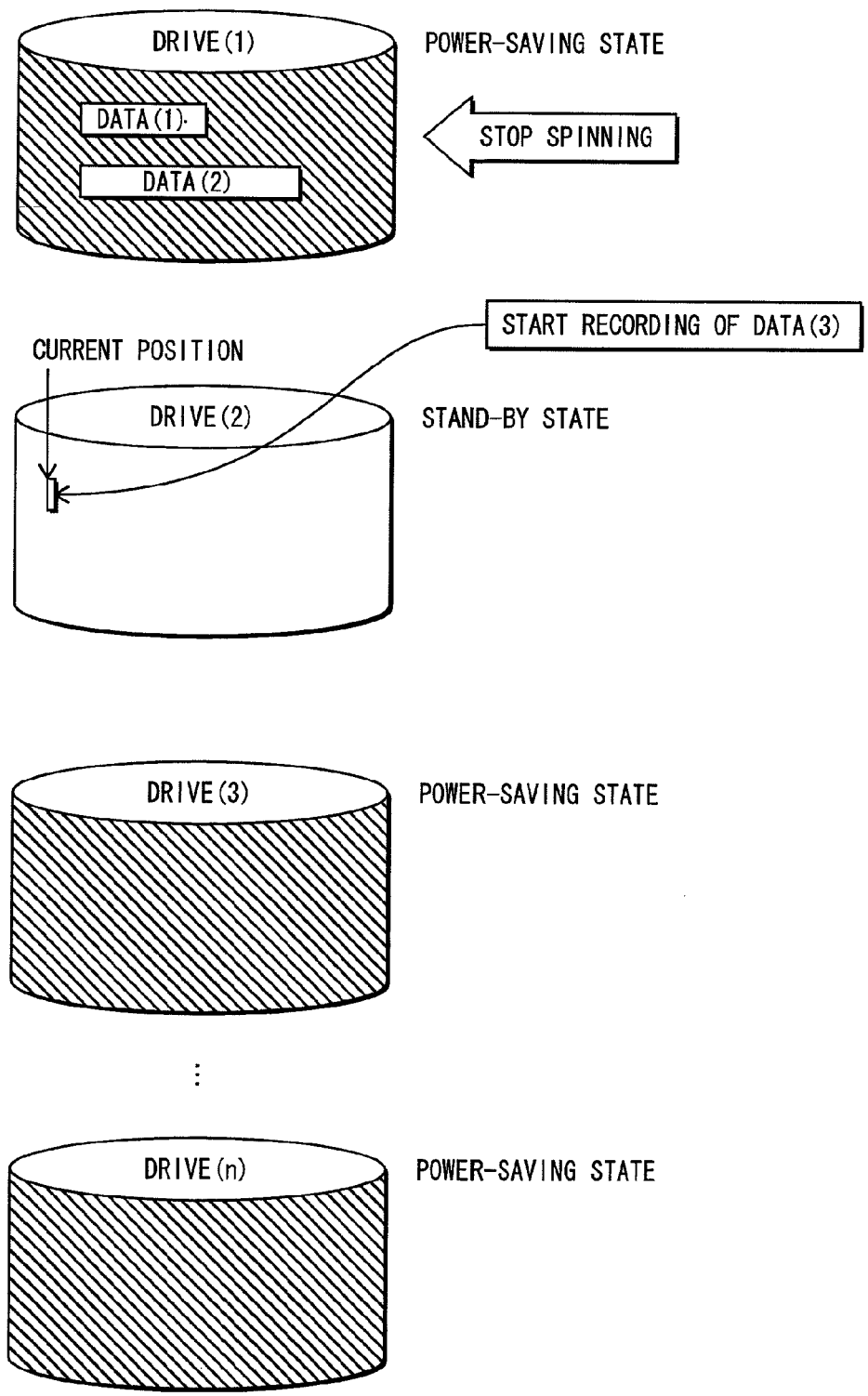
FIG. 12 shows usage states of drive devices after spin up operation of a drive device that has been accessed previously, which is included in the recording operations pertaining to the second embodiment of the present invention.

Upon running out of the free space of the recording medium driven by the drive device DRIVE(1), the state control unit 210 puts the drive device DRIVE(1) into the power-saving state to stop the spinning of the DRIVE(1). After that, the control unit 200 starts recording of the video/audio data segment DATA(3) as FIG. 12 shows.

Upon completion of the recording, the control unit 200 updates the video/audio data management information, including the number of the video/audio data segments, the identifier of the drive device onto which the video/audio data segment has been recorded, the size and the bit rate of the recorded video/audio data segment, etc.

Figure 13:
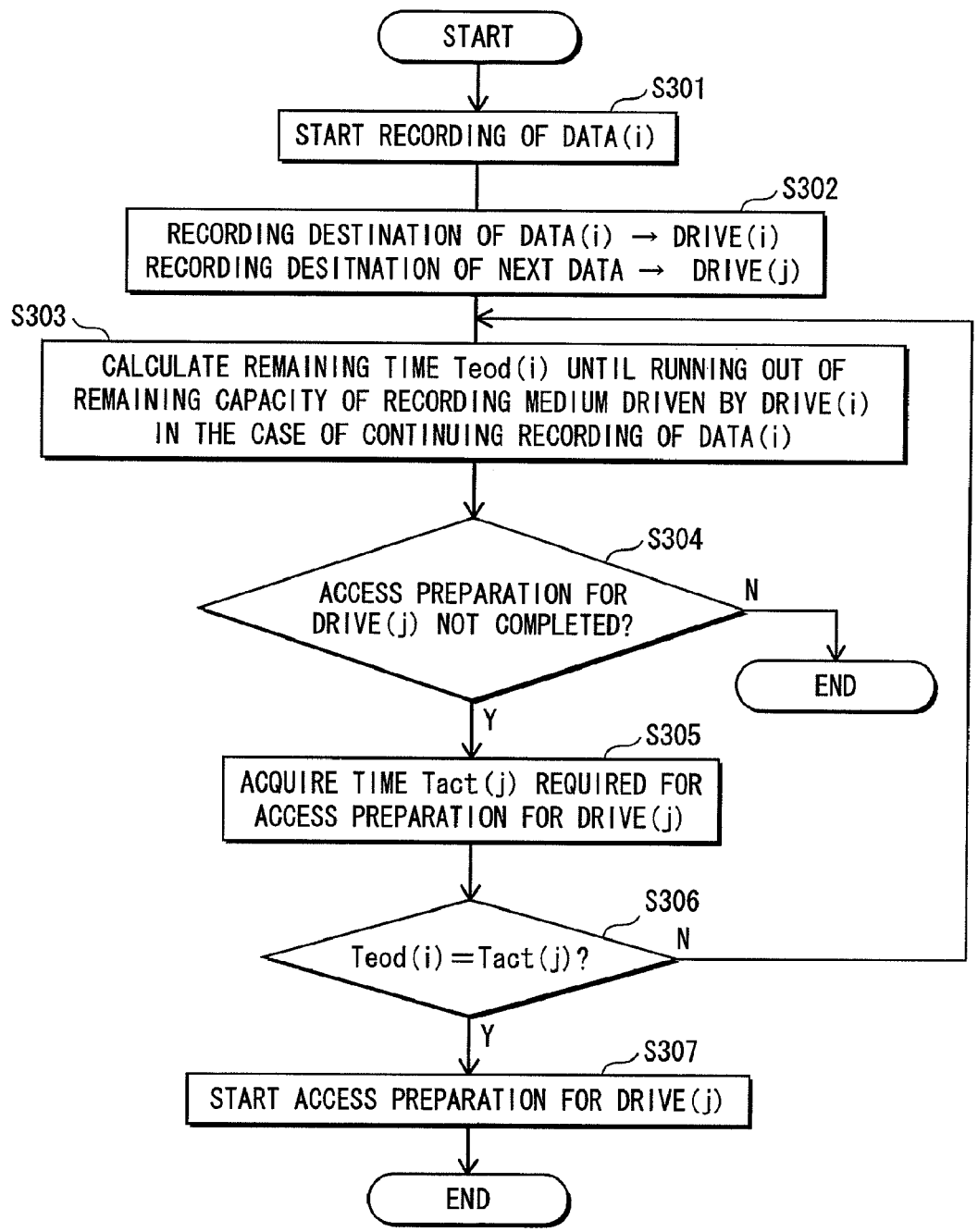
FIG. 13 is a flowchart showing the recording operations pertaining to the second embodiment of the present invention.

Next, the recording operations performed by the recording/playback apparatus described above are explained with reference to the flowchart shown in FIG. 13. FIG. 13 shows the case of sequentially recording a plurality of video/audio data segments of a content requested by the user onto a recording medium that has a free space and is driven by one of the drive device group 150. FIG. 13 explains operations for starting the access preparation operation for a video/audio data segment DATA(j) that is to be recorded next, due to running out of the free space during the recording of the $i^{th}$ video/audio data segment DATA(i).

It is assumed in FIG. 13 that the recording of the video/audio data segment DATA(i), requested by the user, has been started (S301).

The recording/playback apparatus recognizes the drive device DRIVE(i), which drives the recording medium on which the video/audio data segment DATA(i) is being recorded, and the drive device DRIVE(j), which drives the recording medium that will be the next recording target when the free space of the recording medium that is being driven by the drive device DRIVE(i) and recording the video/audio data segment DATA(i) runs out (S302).

Next, the recording/playback apparatus calculates a time Teod(i) that is the remaining time until the running out of the free space of the recording medium driven by the drive device DRIVE(i) in the case the recording of the video/audio data segment DATA(i) is continued (S303).

If the drive device DRIVE(j) is in the stand-by state (S304 N), the recording/playback apparatus continues the recording (not clearly specified in the flowchart).

If the drive device DRIVE(j) is not in the stand-by state (S304 Y), the recording/playback apparatus acquires a time Tact(j), which is a time required for the access preparation operation for the drive device DRIVE(j) (S305).

The recording/playback apparatus judges whether the time Teod(i) and the time Tact(j) are the same (S306), and if they are not the same (S306 N), repeats the steps from the step S306 until they become the same. Here, the judgment as to whether the time Teod(i) and the time Tact(j) are the same may be performed flexibly. For example, when a difference calculated by subtracting the time Tact(j) from the time Teod(i) is smaller than a prescribed value (e.g. 1 second), the recording/playback apparatus may judge that they are the same.

If the time Teod(i) and the time Tact(j) are the same (S306 Y), the recording/playback apparatus starts the access preparation operation for the drive device DRIVE(j) (S208), and continues the normal recording.

According to these operations, it is possible to put a drive device that derives a recording medium to be the next recording target into the stand-by state before running out of the free space of the recording medium as the current recording target. At the same time as the running out of the free space of the recording medium as the current recording target, the access preparation operation for the drive device that drives the recording medium as the next recording target completes. Therefore, the recording/playback apparatus can seamlessly continue the recording without consuming extra power.

Other Embodiments

Note in the first embodiment that if the playback speed is changed to the fast-forwarding or the fast-rewinding according to the user's instruction input from the operation input unit 160, the state control unit 210 may immediately start the access preparation operation for the drive device that drives the recording medium on which the video/audio data segment to be played back next is recorded.

The first embodiment explains an example case where the access preparation operation is performed for a drive device that drives the recording medium on which the video/audio data segment to be played back next is recorded. However, the access preparation operation may be additionally performed for other video/audio data segments following the video/audio data segment to be played back next. This realizes seamless playback even in the case where, for example, the playback duration of the video/audio data segment to be played back next is short, or the playback duration of the video/audio data segment to be played back next is shortened due to a particular playback operation such as the fast-forwarding.

In both the first and the second embodiments, the control unit 200, etc. may be typically realized as an LSI (Large Scale Integration) which is a type of integrated circuit. The units may be individually realized as one chip. Also, two or more units, or part of each unit may be realized as one chip. Note that although an LSI is used here, the circuit may be variously described as an IC (Integrated Circuit), a system LSI, a super LSI or an ultra LSI depending on the level of integration. Note also that the technique used for the integration does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used. Moreover, if, due to progress in the field of semiconductor technology or the derivation of another technology, a technology to replace LSI emerges, such a technology may be used to integrate the functional blocks. The use of biotechnology or the like is considered to be a possibility.

INDUSTRIAL APPLICABILITY

The present invention provides a recording/playback apparatus in which a plurality of drive devices are combined and used as a drive device group that realizes high performance at the same level as a large-capacity hard disk. Due to power-saving management, the present invention provides a recording/playback apparatus that is capable of recording large data with low power consumption at low cost.

What is claimed is:

1. A playback apparatus that performs sequential playback by reading a plurality of video/audio data segments from a plurality of recording media each driven by a different one of drive devices, the playback apparatus comprising:

a calculation unit operable to calculate a remaining time until completion of reading of one of the video/audio data segments that is being played back as a current playback target, before the completion of the reading; and a state control unit operable to put, into a power-saving state, any of the drive devices other than one that drives a recording medium that stores the current playback target, wherein if the remaining time is equal to a prescribed time, the state control unit puts, into a stand-by state from the power-saving state, one of the drive devices that drives a recording medium that stores another one of the video/audio data segments that is to be played back subsequently to the current playback target, and the video/audio data segments have been generated by dividing a single content.

2. A recording apparatus that performs sequential recording by writing a plurality of video/audio data segments onto a plurality of recording media each driven by a different one of drive devices, the recording apparatus comprising:

a calculation unit operable to calculate a remaining time until completion of recording of one of the video/audio data segments that is being recorded as a current recording target, before the completion of the recording; and a state control unit operable to put, into a power-saving state, any of the drive devices other than one that drives a recording medium onto which the current recording target is being recorded, wherein if the remaining time is equal to a prescribed time, the state control unit puts, into a stand-by state from the power-saving state, one of the drive devices that drives a recording medium onto which a next recording target is to be recorded, the next recording target being another one of the video/audio data segments that is to be recorded subsequently to the current recording target.

3. The recording apparatus of claim 2, wherein
the recording media driven by the drive devices are disk media, and
the state control unit instructs the one of the drive devices that drives the recording medium onto which the next recording target is to be recorded to spin up a disk medium thereof in order to put the one of the drive devices into the stand-by mode.

4. The recording apparatus of claim 3, wherein
when the recording of the current recording target is completed and recording of the next recording target is started, the state control unit puts, into the power-saving state, the one of the drive devices that drives the recording medium on which the current recording target has been recorded completely.

5. The recording apparatus of claim 2, wherein
the calculation unit calculates the remaining time based on a remaining capacity of the recording medium onto which the current recording target is being recorded and a bit rate used for the recording of the current recording target, and
the prescribed time corresponds to a time required for spinning up the recording medium onto which the next recording target is to be recorded.

6. The recording apparatus of claim 2, wherein
the plurality of video/audio data segments have been generated by dividing a single content.

7. A playback method for performing sequential playback by reading a plurality of video/audio data segments from a plurality of recording media each driven by a different one of drive devices, the playback method comprising:
a calculation step of calculating a remaining time until completion of reading of one of the video/audio data segments that is being played back as a current playback target, before the completion of the reading; and
a state control step of putting, into a power-saving state, any of the drive devices other than one that drives a recording medium that stores the current playback target, wherein
if the remaining time is equal to a prescribed time, the state control step puts, into a stand-by state from the power-saving state, one of the drive devices that drives a recording medium that stores another one of the video/audio data segments that is to be played back subsequently to the current playback target, and
the video/audio data segments have been generated by dividing a single content.

8. A recording method for performing sequential recording by writing a plurality of video/audio data segments onto a plurality of recording media each driven by a different one of drive devices, the recording method comprising:
a calculation step of calculating a remaining time until completion of recording of one of the video/audio data segments that is being recorded as a current recording target, before the completion of the recording; and
a state control step of putting, into a power-saving state, any of the drive devices other than one that drives a recording medium onto which the current recording target is being recorded, wherein
if the remaining time is equal to a prescribed time, the state control step puts, into a stand-by state from the power-saving state, one of the drive devices that drives a recording medium onto which a next recording target is to be recorded, the next recording target being another one of the video/audio data segments that is to be recorded subsequently to the current recording target.

9. An integrated circuit for a playback apparatus that performs sequential playback by reading a plurality of video/audio data segments from a plurality of recording media each driven by a different one of drive devices, the integrated circuit comprising:
a calculation unit operable to calculate a remaining time until completion of reading of one of the video/audio data segments that is being played back as a current playback target, before the completion of the reading; and
a state control unit operable to put, into a power-saving state, any of the drive devices other than one that drives a recording medium that stores the current playback target, wherein
if the remaining time is equal to a prescribed time, the state control unit puts, into a stand-by state from the power-saving state, one of the drive devices that drives a recording medium that stores another one of the video/audio data segments that is to be played back subsequently to the current playback target, and
the video/audio data segments have been generated by dividing a single content.

10. An integrated circuit for a recording apparatus that performs sequential recording by writing a plurality of video/audio data segments onto a plurality of recording media each driven by a different one of drive devices, the integrated circuit comprising:
a calculation unit operable to calculate a remaining time until completion of recording of one of the video/audio data segments that is being recorded as a current recording target, before the completion of the recording; and
a state control unit operable to put, into a power-saving state, any of the drive devices other than one that drives a recording medium onto which the current recording target is being recorded, wherein
if the remaining time is equal to a prescribed time, the state control unit puts, into a stand-by state from the power-saving state, one of the drive devices that drives a recording medium onto which a next recording target is to be recorded, the next recording target being another one of the video/audio data segments that is to be recorded subsequently to the current recording target.

* * * * *